(12) United States Patent
Wiles et al.

(10) Patent No.: US 12,264,994 B2
(45) Date of Patent: Apr. 1, 2025

(54) LEAK DETECTION IN ELECTRONIC DEVICES

(71) Applicant: Apple Inc., Cupertino, CA (US)

(72) Inventors: Brentley M. Wiles, San Jose, CA (US); Jeanny Wang, Oakland, CA (US); David MacNeil, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 18/124,483

(22) Filed: Mar. 21, 2023

(65) Prior Publication Data

US 2023/0408363 A1 Dec. 21, 2023

Related U.S. Application Data

(60) Provisional application No. 63/345,371, filed on May 24, 2022.

(51) Int. Cl.
*G01M 3/26* (2006.01)

(52) U.S. Cl.
CPC .................................. *G01M 3/26* (2013.01)

(58) Field of Classification Search
CPC ............. G01M 3/00; G01M 3/26; G01M 3/28
See application file for complete search history.

(56) References Cited

U.S. PATENT DOCUMENTS

2022/0364948 A1* 11/2022 Dewailly ............ G01M 3/2815

* cited by examiner

*Primary Examiner* — Nguyen Q. Ha
(74) *Attorney, Agent, or Firm* — BAKERHOSTETLER (57) ABSTRACT

Aspects of the subject technology relate to a device including a pressure sensor to measure a pressure level in a port cavity. A port allows equalization of air pressure between the port cavity and an outside environment. A vent port within the port cavity allows equalization of air pressure between the port cavity and an internal volume of a housing of the device. A tool is used to activate a heat-generating component of the device while the port is obstructed for a predetermined time duration to enable detecting a sealing efficacy of the housing.

20 Claims, 6 Drawing Sheets

LEAK DETECTION IN ELECTRONIC DEVICES

CROSS-REFERENCE TO RELATED APPLICATIONS

The present application claims the benefit of U.S. Provisional Patent Application Ser. No. 63/345,371, entitled "LEAK DETECTION IN ELECTRONIC DEVICES" filed on May 24, 2022, which is hereby incorporated by reference in its entirety for all purposes.

TECHNICAL FIELD

The present description relates generally to electronic devices and, more particularly, but not exclusively, to leak detection in smart devices via pressure sensing and internal heating. The subject technology also relates to tamper detection in the case of fraudulent returns of such devices.

BACKGROUND

Pressure sensors are being increasingly integrated into wearable and portable devices such as smartwatches and smartphones. The pressure sensors in smart devices can be used to measure elevation and depth in water, as well as other applications. Wearable devices are required to survive water immersion activities and exposure situations, for example, swimming, diving, showering, and sweat type of exposures. For water immersion resistance, for instance, these devices need to have strong and long-lasting sealing. Over time, abnormal usage, for example, exposure to excessive heat, could result in oxidation of the material of the seal, or impact events such as dropping the device can cause the seal to fail. While a device can be viable for many years, degraded sealing can lead to an early end-of-life for the product due to unexpected water exposure. It would be desirable to be able to check and detect effective sealing of the smart device before the device stops functioning.

BRIEF DESCRIPTION OF THE DRAWINGS

Certain features of the subject technology are set forth in the appended claims. However, for purposes of explanation, several aspects of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block-diagram form in order to avoid obscuring the concepts of the subject technology.

The subject disclosure is directed to leak detection due to a lack of sealing efficacy in electronic devices, such as a smart device, via pressure sensing and internal heating. The lack of sealing efficacy can be, for example, due to age or impact that may damage, sealing material of these devices and result in a leak when the device is immersed in water or exposed to water, moisture or sweat. In one example, detection of a lack of sealing efficacy of the device can permit a user or customer service representative to check and detect damaged sealing material of the smart device. Upon detection of the leak, the customer service representative may replace the seal or warn the customer against exposing their devices to high-risk environments in order to increase the life of the device.

In one or more implementations, the lack of sealing efficacy can be the result of tampering the system 100A by the user. For example, when an electronic device such as a smart device e.g. a smartphone, a tablet or a smartwatch is returned to a vendor, the electronic device goes through a long line of checks to make sure that the electronic device is being returned for a valid reason instead of being tampered with and returned. The application of the subject technology that enables detection of proper sealing of the newly purchased and returned electronic devices can be on the frontline of fraud detection for current electronic devices and particularly for future electronic devices, where the barometric vent and pressure sensor may share a port.

In one or more aspects, the subject technology relates to a device including a pressure sensor to measure a pressure level in a port cavity. A first port allows equalization of air pressure between the port cavity and an outside environment. A second port within the port cavity allows equalization of air pressure between the port cavity and an internal volume of a housing of the device. A tool is used to activate a heat-generating component of the device while the first port is obstructed for a predetermined time duration to enable detecting a damage in a seal of the housing.

Figure 1A:
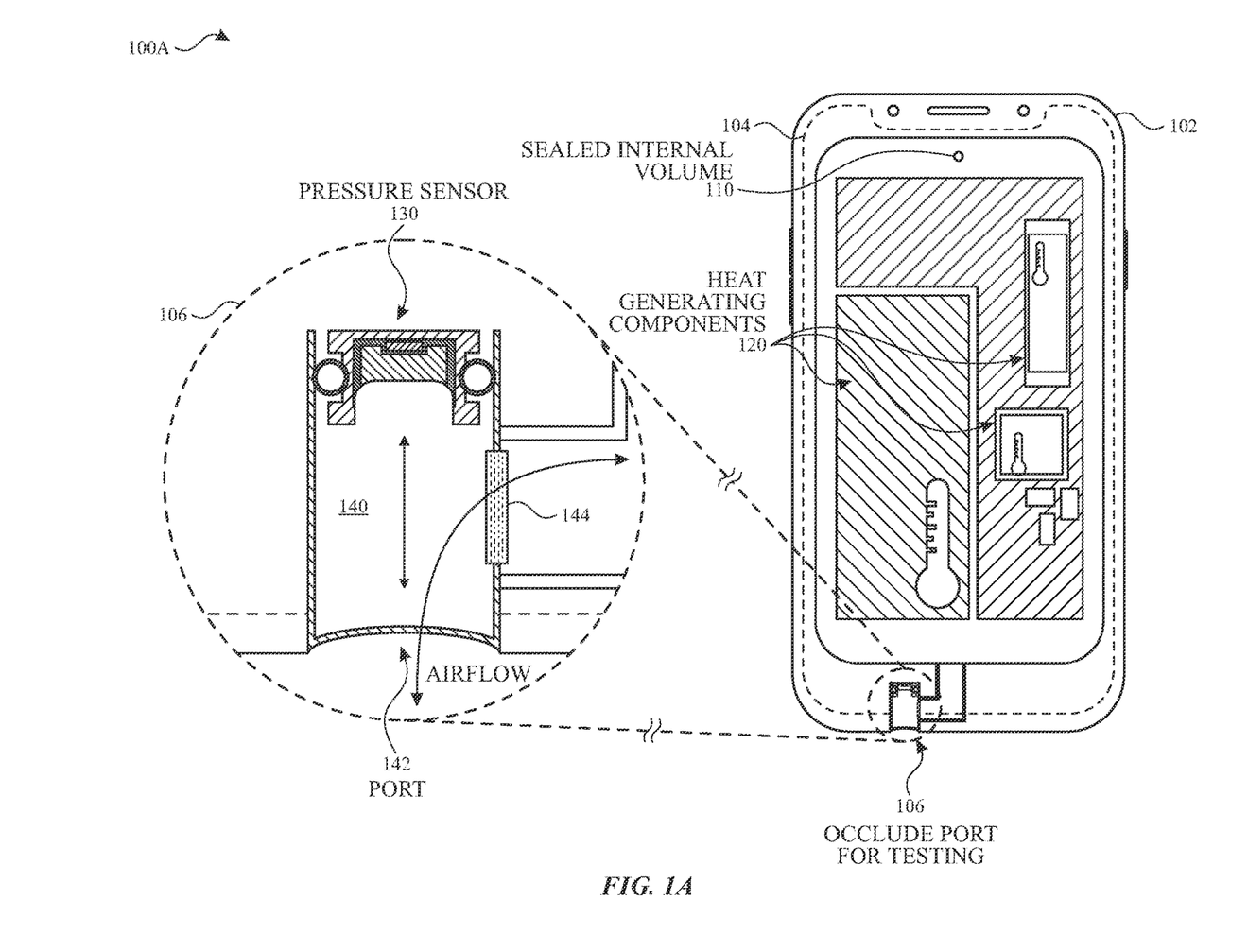
FIGS. 1A, 1B and 1C are schematic diagrams illustrating an example system with leak detection via pressure sensing and internal heating and corresponding airflow obstruction schemes, in accordance with various aspects of the subject technology.
Figure 1B:
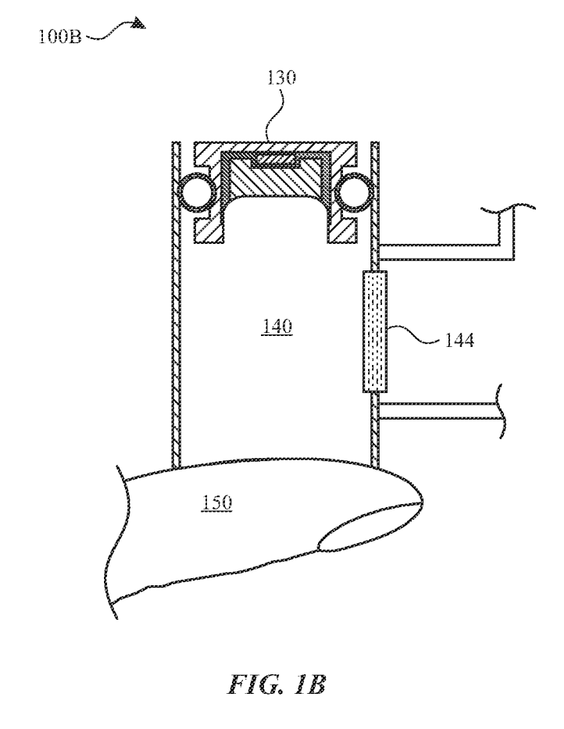
Figure 1C:
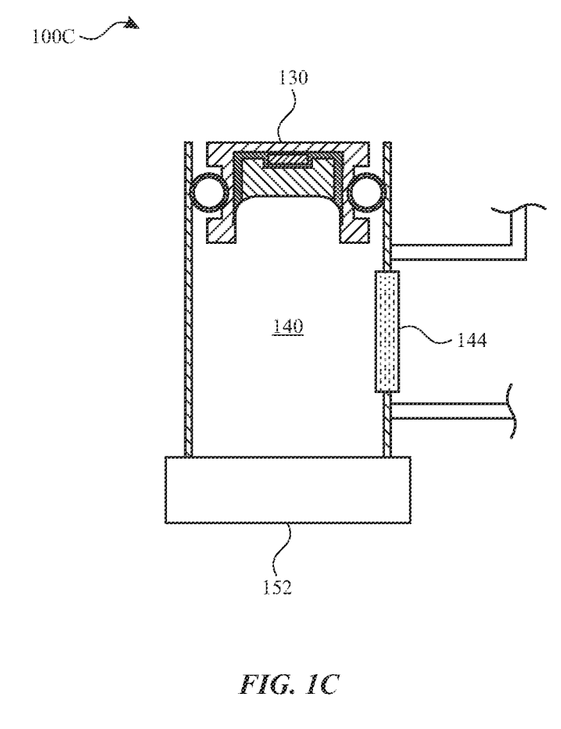

FIGS. 1A, 1B and 1C are a schematic diagram illustrating an example system 100A with leak detection via pressure sensing and internal heating and corresponding airflow obstruction schemes 100B and 100C, in accordance with various aspects of the subject technology. In some aspects, examples of the system 100A include but are not limited to a smart device such as a handheld or wearable device, for example, a smartphone or a smartwatch. In one or more aspects, the system 100A includes a housing 102 sealed by a sealing component (e.g., gasket) 104 that substantially prevents water, moisture, sweat, or other intruding agents from entering the housing. The system 100A, among other components and circuits, includes heat-generating components 120, which may include, but is not limited to, a system-on-chip (SOC), a graphical processing-unit (GPU), a power management unit (PMU), and a battery charger. Each of the heat-generating components 120 is associated with a tool, such as a software tool, for example, and an application running on a processor of the system 100A, which can control activation of that components. In one or more implementations the battery charger can be a wireless charger. In this case, placing the system 100A on the wireless charger may result in heating an internal volume 110 of the housing 102. Heating of the internal volume 110 can include heating air and components within the internal volume 110.

A user of the system 100A, a customer service agent, or a technician may use the software tool to activate one or more of the heat-generating components 120 to detect a leak due to a damaged sealing component 104, as further explained herein. The damage to the sealing component 104 may occur as the system ages, for example, due to oxidation of the material of the sealing component 104 or impact events that can occur over time. The housing 102 also includes an occlude port 106 for testing, which, as shown in the exploded view, includes a port cavity 140 that is connected to the housing 102 via a vent port (also referred to as a second port) 144, which is, in an example, an air-permeable and waterproof membrane. The second port 144 allows equalization of air pressure between the port cavity 140 and the internal volume 110 of the housing 102 of the system 100A. The port cavity 140 includes a pressure sensor 130 and a first port 142, which allows equalization of air pressure between the port cavity 140 and an outside environment. The pressure sensor 130 can measure a pressure level in the port cavity 140, which, in equilibrium, is the same as the pressure inside the housing 102 and the outside environment. The measured pressure can be displayed by a pressure indicator or pressure monitor controlled by software on the display of the system 100A.

FIG. 1B shows an example airflow obstruction scheme 100B, in which the airflow into the port cavity 140 is obstructed via a user's hand such as a fingertip 150 for a predetermined time duration to enable detecting the seal efficacy of the housing. When the port cavity 140 is obstructed, by increasing the internal temperature of the system 100A, via heating the internal volume 110 of the housing 102, it can be verified that the pressure responds appropriately to the temperature change (as discussed below). If the pressure does not rise in response to the temperature increase that could be due to a number of factors, including, but not limited to, a damaged seal.

FIG. 1C shows an example airflow obstruction scheme 100C, in which the airflow into the port cavity 140 is obstructed via an auxiliary component such as a device 152 for a predetermined time duration to enable detecting the seal efficacy of the housing. As explained above, when the port cavity 140 is obstructed, by increasing the internal temperature of the system 100A, it can be verified that the pressure responds appropriately to the temperature change to test the seal efficacy of the housing.

Figure 2A:
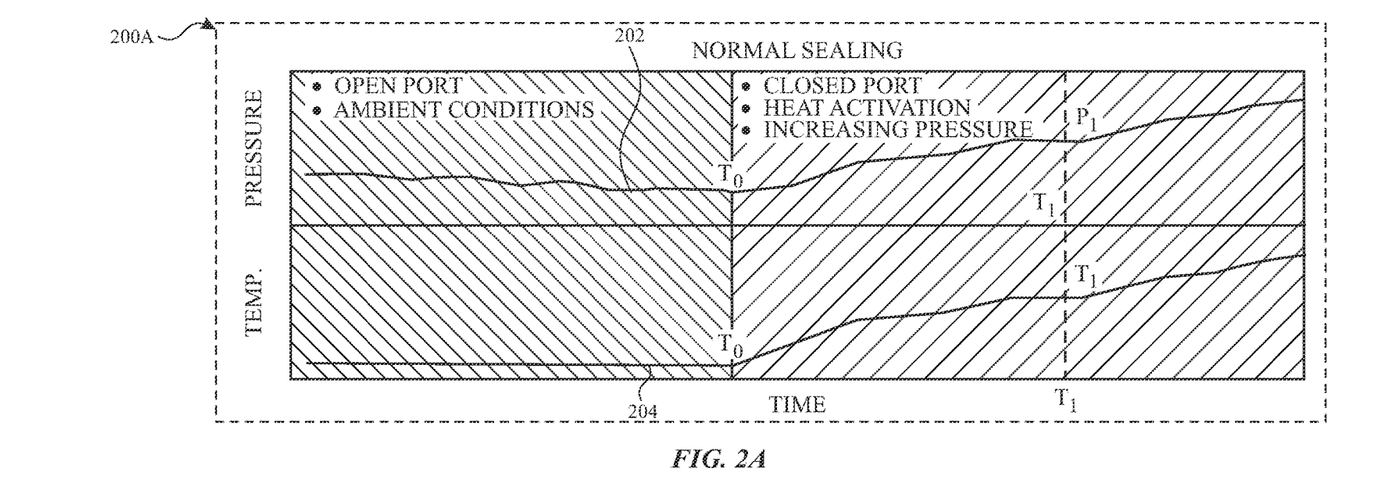
FIG. 2A is a chart, illustrating an example variation of pressure and temperature versus time before and after heat activation with a normal sealing of the system of FIG. 1, in accordance with various aspects of the subject technology.

FIG. 2A is a chart 200A illustrating an example variation of pressure and temperature versus tune before and after heat activation with a normal sealing of the system 100A of FIG. 1, in accordance with various aspects of the subject technology. In the chart 200A, plots 202 and 204 show pressure and temperature variation of the inside volume of the housing 102 of the system 100A of FIG. 1 with normal sealing, accordingly, Portions of the plots 202 and 204 before a time $t_0$ correspond to an open port (e.g., the first port 142 of FIG. 1) and ambient conditions. The other portions of the plots 202 and 204 after the time $t_0$ correspond to the port being closed and with heat-generation activation, which result in increasing the pressure in the inside volume of the housing 102 over time. It is known that in an ideal gas, the temperature change needed to cause a pressure change follows the ideal gas law, PV=nRT, which in turn results in $(P_1V_1/T_1) \propto (P_2V_2/T_2)$, where P, V and T represent pressure, volume and temperature, respectively. An ideal gas obeys the gas law at all temperatures and pressures, but real gases do not obey the gas law at all temperatures and pressures, which allow the as molecules to be sufficiently separated from one another. The error in approximation of the air inside the internal volume of the housing 102 with the ideal gas would not considerably change the results discussed here. In the situation under consideration, when the sealing component (e.g., 104 of FIG. 1) is in normal condition (not damaged), the change of volume due to pressure build up within the housing is negligible (V1~V2), therefore, the pressure rises proportional to the temperature when the heat generation is activated (after time $t_0$). The time $t_1$ signifies the moment that the measured pressure $P_1$ (e.g., by the pressure sensor 130 of FIG. 1) corresponding to a temperature $T_1$ is read. In some aspects, when the device seals are fully functional, heating the internal volume of the device by about 10° C. for a period of about 60 seconds can cause a pressure offset of about 2 kPa.

Figure 2B:
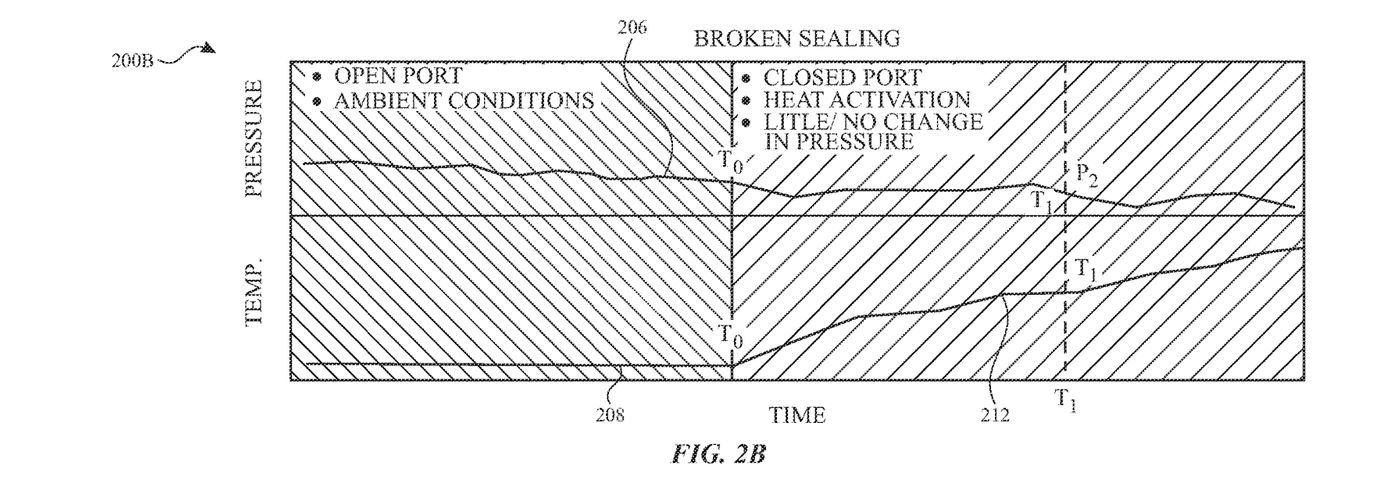
FIG. 2B is a chart illustrating an example variation of pressure and temperature versus time before and after heat activation with a broken sealing of the system of FIG. 1, in accordance with various aspects of the subject technology.

FIG. 2B is a chart illustrating an example variation of pressure and temperature versus time before and after heat activation with a broken sealing of the system 100A of FIG. 1, in accordance with various aspects of the subject technology. In the chart 200B, plots 206 and 208 show pressure and temperature variation of the inside volume of the housing 102 of the system 100A, accordingly, when the housing seal (e.g., 104 of FIG. 1) is broken (damaged). Portions of the plots 202 and 204 before the time $t_0$ correspond to an open port (e.g., the first port 142 of FIG. 1) and ambient conditions. The other portions of the plots 202 and 204 after the time $t_0$ correspond to the port being closed (e.g., by user's hand such as a fingertip or another device) and with heat-generation activation. Because the sealing component is broken (damaged), the volume of the housing is no longer constant. Therefore, the pressure does not rise as expected, for example, in a linear manner proportional to the temperature when the heat generation is activated (after time $t_0$). For example, as seen from the plot 206, the pressure after the time $t_0$ does not follow the increasing trend of plot 202, as expected, and may stay the same or decrease after the time $t_0$. Accordingly, at the time the measured pressure $P_2$ (e.g., by the pressure sensor 130 of FIG. 1) is not the same as the pressure $P_1$ of the plot 202. Thus, the subject technology provides a technique for detecting a broken seal component of the system 100A, as further discussed below.

The time $t_1$ can be estimated, based on the component-air heating time and an internal heat transfer time. It can be shown that for a typical sealed volume of about 2 ml of the housing and in ambient conditions, a temperature increase of about 7° C., can result in an internal pressure increase of 2 kPa in under 30 seconds. Thus, in general, a value within a range of 30 to 60 seconds can be reasonably used for the time $t_1$ when the pressure measured by the pressure sensor is read.

Figure 3:
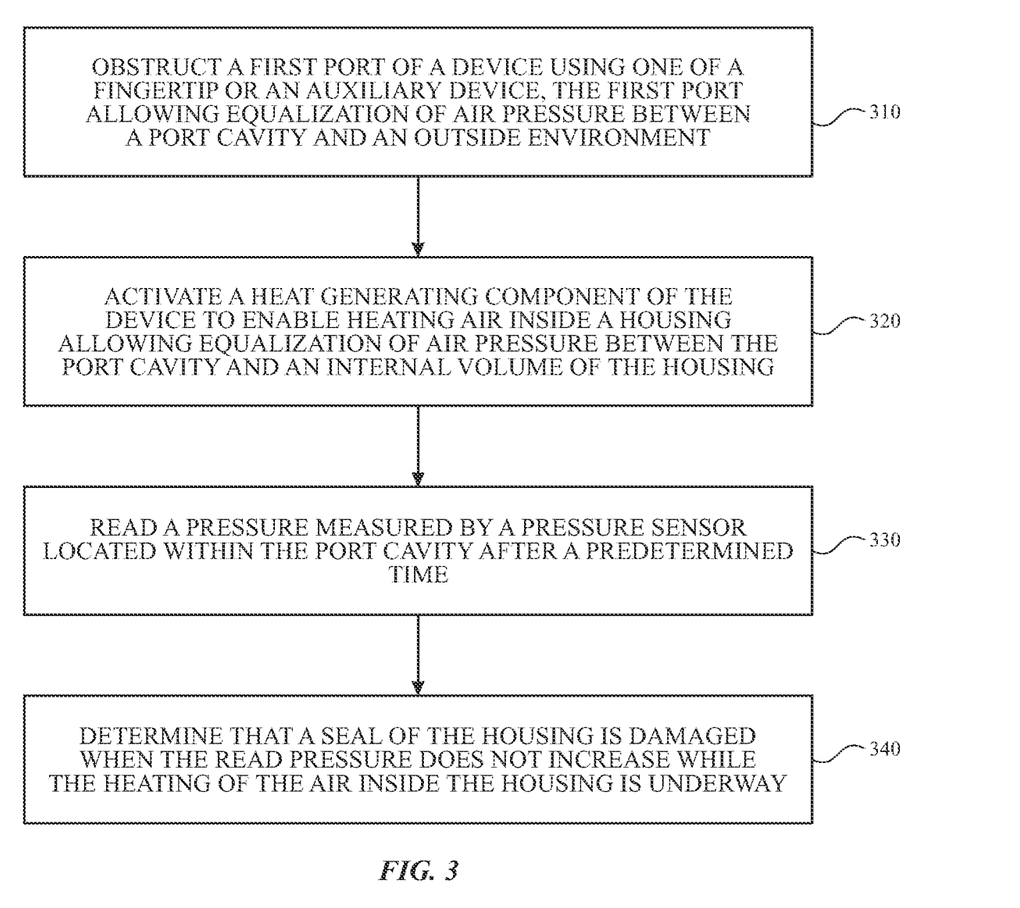
FIG. 3 is a flow diagram illustrating an example method of leak detection n a smart device via pressure sensing and internal heating, in accordance with various aspects of the subject technology.

FIG. 3 is a flow diagram illustrating an example method 300 of leak detection in a smart device via pressure sensing and internal heating, in accordance with various aspects of the subject technology. For explanatory purposes, the method 300 is primarily described herein with reference to the system 100A of FIG. 1. However, the method 300 is not limited to the system 100A, and one or more blocks (or operations) of the method 300 may be performed by one or more other components of the system 100A not shown in FIG. 1. Further for explanatory purposes, the blocks of the example method 300 are described herein as occurring in serial, or linearly. However, multiple blocks of the example method 300 may occur in parallel. In addition, the blocks of the example method 300 need not be performed in the order.

The method 300 includes obstructing a first port (e.g., 142 of FIG. 1) of a device (e.g., system 100A of FIG. 1) using one of a fingertip or an auxiliary component, wherein the first port allows equalization of air pressure between a port cavity (e.g., 140 of FIG. 1) and an outside environment (310). The method 300 further includes activating a heat-generating component (e.g., any of 120 of FIG. 1) of the device to enable heating of air inside a housing (e.g., 102 of FIG. 1), wherein the housing is coupled to the port cavity via a second port (e.g., 144 of FIG. 1) that allows equalization of air pressure between the port cavity and an internal volume of the housing (e.g., 110 of FIG. 1) (320). A pressure measured by a pressure sensor (e.g., 130 of FIG. 1) located within the port cavity is read after a predetermined time (330). It is determined that a seal (e.g., 104 of FIG. 1) of the housing is damaged when a read pressure does not increase while the heating of the air inside the housing is underway (340).

Figure 4:
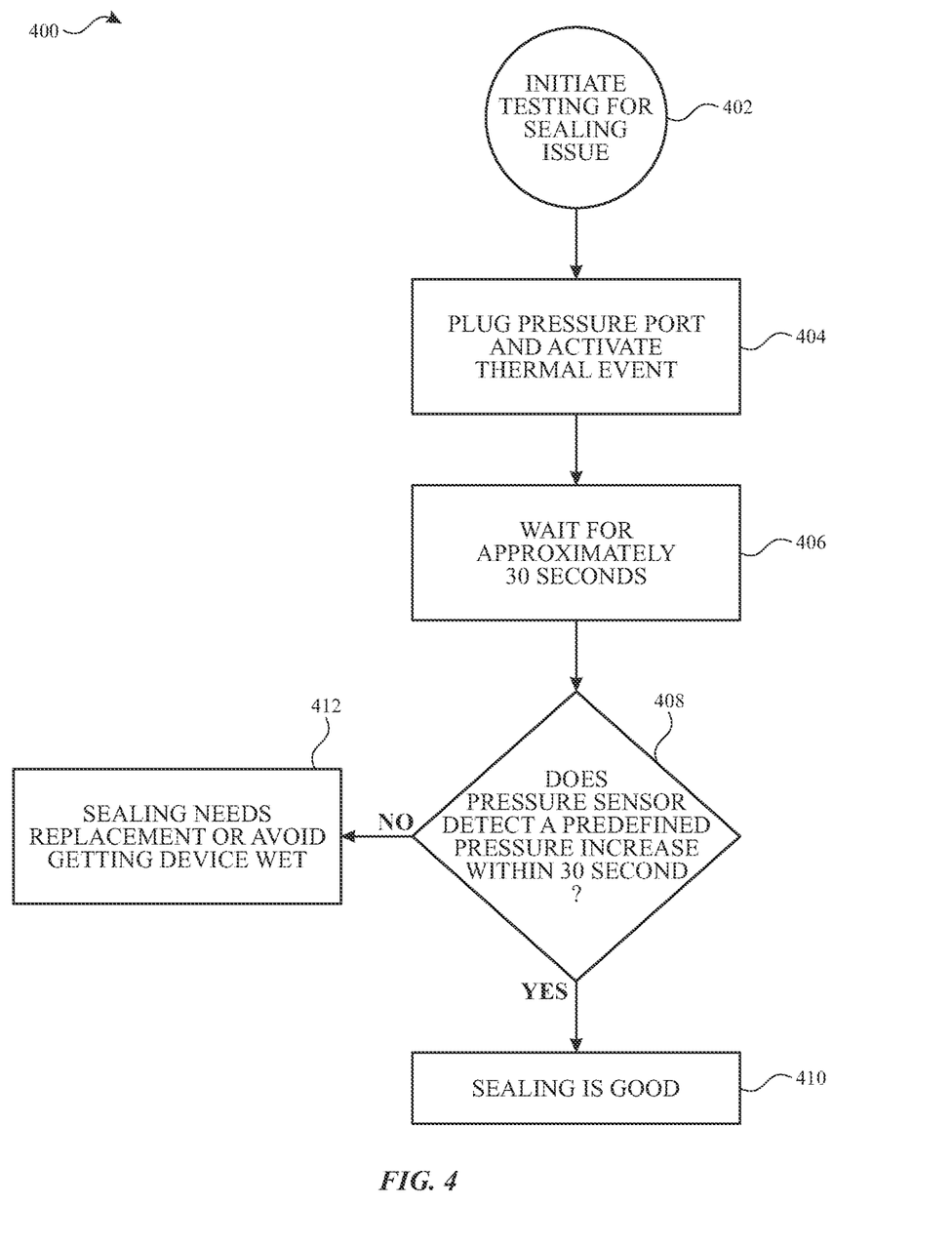
FIG. 4 is a flow diagram illustrating an example process of leak detection in a smart device via pressure sensing and internal heating, in accordance with various aspects of the subject technology.

FIG. 4 is a flow diagram illustrating an example process 400 of leak detection in a smart device (e.g., system 100A of FIG. 1) via pressure sensing and internal heating, in accordance with various aspects of the subject technology. The process 400 starts at operation block 402, where testing for sealing issue is initiated. The testing, as described herein, can be performed by a user of the smart device or by a technician or a customer service agent of a vendor company. At operation block 404, a pressure port (e.g., the first port 142 of FIG. 1) is plugged using a fingertip or an auxiliary component, and a thermal event is activated, for example, by using a tool (application) on the smart device to activate on of the heat-generating components (e.g., 120 of FIG. 1). In some aspects, the user may place the smart device on a wireless charger that can generate heat inside the sealed volume (e.g., 110 of FIG. 1) the smart device. At operation block 406, the user, technician or agent waits for a predetermined time (e.g., about 30 seconds). At operation block 408, the pressure measured by the pressure sensor (e.g., 130 of FIG. 1) is read to check whether a predetermined pressure increase (e.g., about 2 kPa occurs within about 30 seconds). If the pressure increase to a predetermined amount based on the temperature change (e.g., about 2 kPa) occurs within about 30 seconds, at operation block 410, itis determined that the sealing component (e.g., 104 of FIG. 1) is in good condition. Otherwise, if the pressure increase to about 2 kPa does not occur within about 30 seconds, at operation block 412, it is determined that the sealing component is not in good condition and needs to be replaced or the smart device should not be gotten wet (e.g., exposed to water or moisture).

Figure 5:
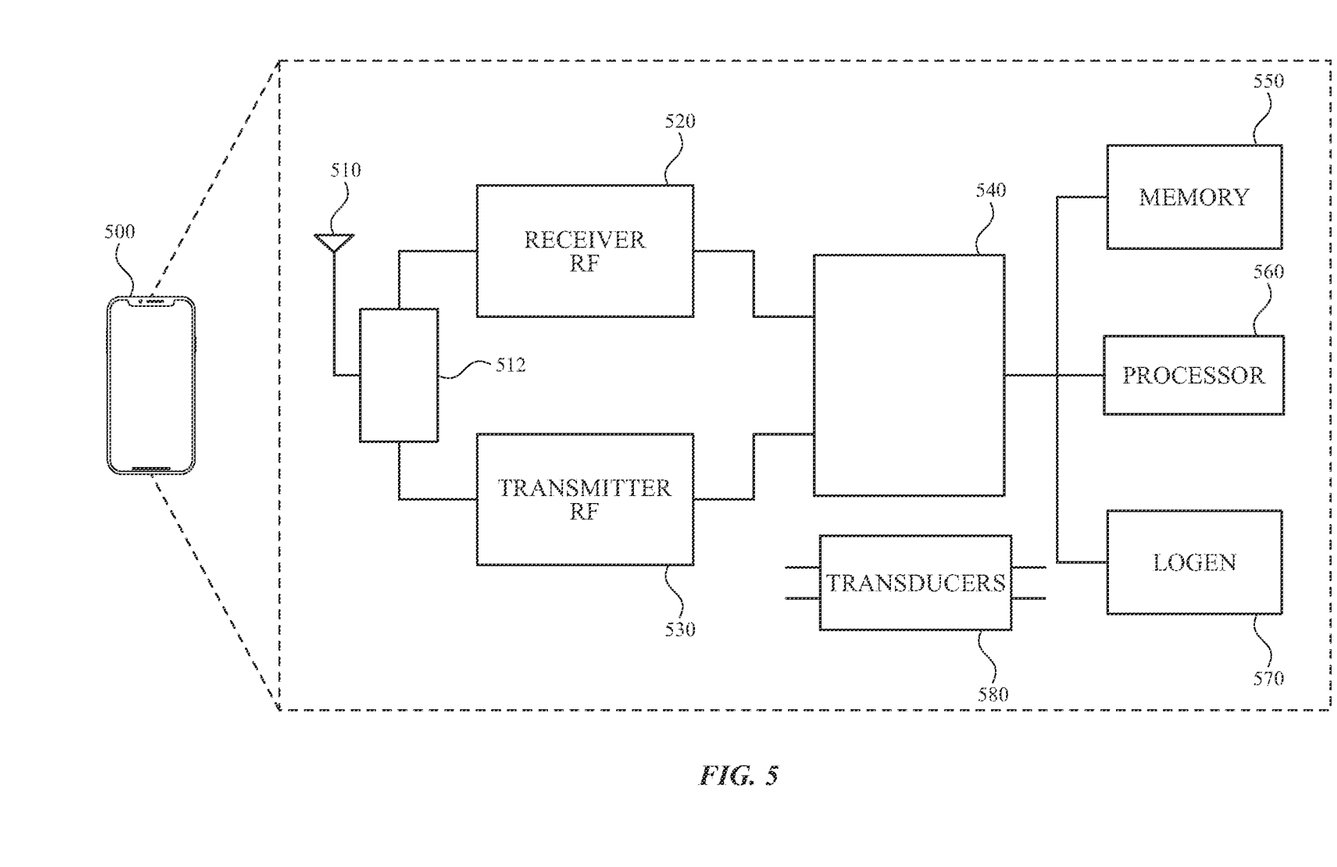
FIG. 5 illustrates a wireless communication device within which some aspects of the subject technology are implemented.

FIG. 5 illustrates a wireless communication device 500 within which some aspects of the subject technology are implemented. In one or more implementations, the wireless communication device 500 can be a tablet, a smartphone, a smartwatch, or other electronic device that includes a pressure sensor. The wireless communication device 500 may comprise an RF antenna 510, a duplexer 512, a receiver 520, a transmitter 530, a baseband processing module 540, a memory 550, a processor 560, a local oscillator generator (LOGEN) 570, and a transducers module 580. In various aspects of the subject technology, one or more of the blocks represented in FIG. 5 may be integrated on one or more semiconductor substrates. For example, the blocks 520-570 may be realized in a single chip, a single system on a chip, or in a multichip chipset.

The receiver 520 may comprise suitable logic circuitry and/or code that may be operable to receive and process signals from the RF antenna 510. The receiver 520 may, for example, be operable to amplify and/or downconvert received wireless signals. In various aspects of the subject technology, the receiver 520 may be operable to cancel noise in received signals and may be linear over a wide range of frequencies. In this manner, the receiver 520 may be suitable for receiving signals in accordance with a variety of wireless standards such as Wi-Fi, WiMAX, BT, and various cellular standards. In various aspects of the subject technology, the receiver 520 may not use any sawtooth acoustic wave filters, and few or no off-chip discrete components such as large capacitors and inductors.

The transmitter 530 may comprise suitable logic circuitry and/or code that may be operable to process and transmit signals from the RF antenna 510. The transmitter 530 may, for example, be operable to upconvert baseband signals to RF signals and amplify RF signals. In various aspects of the subject technology, the transmitter 530 may be operable to upconvert and amplify baseband signals processed in accordance with a variety of wireless standards. Examples of such standards may include Wi-Fi, WiMAX, BT, and various cellular standards. In various aspects of the subject technology, the transmitter 530 may be operable to provide signals for further amplification by one or more power amplifiers.

The duplexer 512 may provide isolation in the transmit band to avoid saturation of the receiver 520 or damaging parts of the receiver 520, and to relax one or more design requirements of the receiver 520. Furthermore, the duplexer 512 may attenuate the noise in the receive band. The duplexer 512 may be operable in multiple frequency bands of various wireless standards.

The baseband processing module 540 may comprise suitable logic, circuitry, interfaces, and/or code that may be operable to perform the processing of baseband signals. The baseband processing module 540 may, for example, analyze received signals and generate control and/or feedback signals for configuring various components of the wireless communication device 500, such as the receiver 520. The baseband processing module 540 may be operable to encode, decode, transcode, modulate, demodulate, encrypt, decrypt, scramble, descramble, and/or otherwise process data in accordance with one or more wireless standards.

The processor 560 may comprise suitable logic, circuitry, and/or code that may enable processing data and/or controlling operations of the wireless communication device 500. In this regard, the processor 560 may be enabled to provide control signals to various other portions of the wireless communication device 500. The processor 560 may also control the transfer of data between various portions of the wireless communication device 500. Additionally, the processor 560 may enable implementation of an operating system or otherwise execute code to manage operations of the wireless communication device 500. In one or more implementations, the processor 560 may be interfaced with the transducer modules 580 via standard host interface technologies such as an inter-integrated circuit (I2C), a serial interface protocol (SPI), a peripheral component interconnect express (PCIE), a universal asynchronous receiver-transmitter (UART), and/or other interface technologies, depending on the data rate needed to sample and pipe from the transducers module to the processor 560.

The memory 550 may comprise suitable logic, circuitry, and/or code that may enable storage of various types of information such as received data, generated data, code, and/or configuration information. The memory 550 may comprise, for example, RAM, ROM, flash, and/or magnetic storage. In various aspects of the subject technology, information stored in the memory 550 may be utilized for configuring the receiver 520 and/or the baseband processing module 540.

The LOGEN 570 may comprise suitable logic, circuitry, interfaces, and/or code that may be operable to generate one or more oscillating signals of one or more frequencies. The LOGEN 570 may be operable to generate digital and/or analog signals. In this manner, the LOGEN 570 may be operable to generate one or more clock signals and/or sinusoidal signals. Characteristics of the oscillating signals such as the frequency and duty cycle may be determined based on one or more control signals from, for example, the processor 560 and/or the baseband processing module 540.

In operation, the processor 560 may configure the various components of the wireless communication device 500 based on a wireless standard according to which it is designed to receive signals. Wireless signals may be received via the RF antenna 510, amplified, and down converted by the receiver 520. The baseband processing module 540 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device 500, data to be stored to the memory 550, and/or information affecting and/or enabling operation of the wireless communication device 500. The baseband processing module 540 may modulate, encode, and perform other processing on audio, video, and/or control signals to be transmitted by the transmitter 530 in accordance with various wireless standards. In one or more implementations, the transducers module 580 may include, but is not limited to, the pressure sensor 130 of FIG. 1A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Various functions described above can be implemented in digital electronic circuitry, as well as in computer software, firmware, or hardware. The techniques can be implemented by using one or more computer program products. Programmable processors and computers can be included in or packaged as mobile devices. The processes and logic flows can be performed by one or more programmable processors and by one or more programmable logic circuitries. General and special-purpose computing devices and storage devices can be interconnected through communication networks.

Some implementations include electronic components such as microprocessors and storage and memory that store computer program instructions in a machine-readable or computer-readable medium (alternatively referred to as computer-readable storage media, machine-readable media, or machine-readable storage media). Some examples of such computer-readable media include RAM, ROM, and flash memory. The computer-readable media can store a computer program that is executable by at least one processing unit and include sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multicore processors that execute software, some implementations are performed by one or more integrated circuits such as application-specific integrated circuits (ASICs) or field-programmable gate arrays (FPGAs). In some implementations, such integrated circuits execute instructions that are stored on the circuit itself.

As used in this specification and any claims of this application, the terms "computer," "processor," and "memory" all refer to electronic or other technological devices. These terms exclude people or groups of people. For the purposes of the specification, the terms "display" or "displaying" mean displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback such as visual feedback, auditory feedback, or tactile feedback. Input from the user can be received in any form, including acoustic, speech, or tactile input.

Many of the above-described features and applications are implemented as software processes that are specified as a set of instructions recorded on a computer-readable storage medium (also referred to as a computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, flash drives, RAM chips, hard drives, and EPROMs. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as subparts of a larger program while remaining distinct software aspects of the subject disclosure. In some implementations, multiple software aspects can also be implemented as separate programs. Finally, any combination of separate programs that together implement a software aspect described herein is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer, on multiple computers that are located at one site, or distributed across multiple sites interconnected by a communication network.

It is understood that any specific order or hierarchy of blocks in the processes disclosed is an illustration of an example approach. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its), and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects, and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations, and vice versa.

The word "example" is used herein to mean "serving as an example or illustration." Any aspect or design described herein as an "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference, and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for," or, in the case of a method claim, the element is recited using the phrase "step for." Furthermore, to the extent that the terms "include," "have," or the like are used in the description or the claims, such terms are intended to be inclusive in a manner similar to the term "comprise," as "comprise" is interpreted when employed as a transitional word in a claim.

What is claimed:

1. A system comprising:
   a pressure sensor configured to measure a pressure level in a port cavity;
   a first port configured to allow equalization of air pressure between the port cavity and an outside environment;
   a second port within the port cavity and configured to allow equalization of air pressure between the port cavity and an internal volume of a housing of the system; and
   a tool configured to activate a heat-generating component of the system while the first port is obstructed for a predetermined time duration to enable detecting a seal efficacy of the housing.

2. The system of claim 1, wherein the heat-generating component comprises, a system-on-chip, a graphical processing-unit, a power management unit, and a battery charger.

3. The system of claim 2, wherein the battery charger comprises a wireless charger and is used as the heat-generating component when the system is placed on the wireless charger.

4. The system of claim 1, wherein the tool comprises a software tool including an application running on the system.

5. The system of claim 1, wherein the first port is configured to be externally obstructed manually by a user.

6. The system of claim 1, wherein the first port is configured to be externally obstructed by using an auxiliary component.

7. The system of claim 1, wherein the second port comprises an air-permeable and waterproof membrane.

8. The system of claim 1, further comprising a pressure monitor configured to display a reading of a pressure of the internal volume of the housing, and wherein the seal efficacy of the housing is detected by examining a response of the pressure of the internal volume of the housing to a temperature rise due to an activation of the heat-generating component.

9. The system of claim 8, wherein damage to a seal of the housing is detected by a non-rising pressure reading of the pressure monitor while the internal volume of the housing is heated by the heat-generating component.

10. The system of claim 8, wherein the predetermined time duration is one of within a range of 30 to 60 seconds or related to a threshold rise in the pressure of the internal volume of the housing.

11. A smart device comprising:
one or more heat-generating components configured to be activated by a tool;
a housing sealed from an outside environment by a sealing component that is configured to prevent moisture from entering the housing; and
a pressure sensor disposed in a cavity and configured to measure a pressure inside the cavity, wherein the pressure inside the cavity is equalized with the outside environment via a first port and with a pressure of an internal volume of the housing via a second port,
wherein the tool is configured to activate at least one of the one or more heat-generating components while the first port is obstructed for a predetermined period to enable detecting a sealing efficacy.

12. The smart device of claim 11, wherein the tool comprises a software tool including an application running on the smart device.

13. The smart device of claim 11, wherein the first port is configured to be externally obstructed by a fingertip.

14. The smart device of claim 11, wherein the second port comprises an air-permeable and waterproof membrane.

15. The smart device of claim 11, further comprising a pressure indicator configured to display a reading of the pressure of the internal volume of the housing.

16. The smart device of claim 15, wherein the sealing efficacy is detected by a non-rising pressure reading of the pressure indicator while a temperature of the internal volume of the housing is increased by the heat-generating components.

17. The smart device of claim 11, wherein the one or more heat-generating components comprise a system-on-chip, a graphical processing-unit, a power management unit, and a battery charger.

18. The smart device of claim 17, wherein the battery charger comprises a wireless charger and is used as a heat-generating component when the smart device is placed on the wireless charger.

19. A method comprising:
obstructing a first port of a device using one of a fingertip or an auxiliary component, the first port allowing equalization of air pressure between a port cavity and an outside environment;
activating a heat-generating component of the device to enable heating of an internal volume of a housing, wherein the housing is coupled to the port cavity via a second port that allows equalization of air pressure between the port cavity and an internal volume of the housing;
reading a pressure measured by a pressure sensor located within the port cavity after a predetermined time; and
determining a sealing efficacy of the housing by a read pressure while the heating of the internal volume of the housing is underway.

20. The method of claim 19, further comprising using a tool including a software tool to activate the heat-generating component, wherein the heat-generating component comprises a system-on-chip, a graphical processing-unit, a power management unit, and a battery charger, and wherein the predetermined time is within a range of 30 to 60 seconds.

* * * * *